US012636799B2

(12) United States Patent
Weitschat

(10) Patent No.: US 12,636,799 B2
(45) Date of Patent: May 26, 2026

(54) GRIPPER JAW, TOOL, TOOL SYSTEM AND METHOD FOR OPERATING A TOOL SYSTEM

(71) Applicant: Deutsches Zentrum für Luft-und Raumfahrt e.V., Bonn (DE)

(72) Inventor: Roman Weitschat, Weßling (DE)

(73) Assignee: DEUTSCHES ZENTRUM FÜR LUFT-UND RAUMFAHRT E.V., Bonn (DE)

( * ) Notice: Subject to any disclaimer, the term of this patent is extended or adjusted under 35 U.S.C. 154(b) by 1044 days.

(21) Appl. No.: 17/761,948

(22) PCT Filed: Sep. 18, 2020

(86) PCT No.: PCT/EP2020/076179
§ 371 (c)(1),
(2) Date: Mar. 18, 2022

(87) PCT Pub. No.: WO2021/053188
PCT Pub. Date: Mar. 25, 2021

(65) Prior Publication Data
US 2022/0339801 A1     Oct. 27, 2022

(30) Foreign Application Priority Data
Sep. 20, 2019    (DE) ..................... 10 2019 125 439.6

(51) Int. Cl.
*B25J 15/00*        (2006.01)
*B25J 15/04*        (2006.01)
(Continued)

(52) U.S. Cl.
CPC ........... *B25J 15/08* (2013.01); *B25J 15/0433* (2013.01); *B25J 19/0025* (2013.01)

(58) Field of Classification Search
CPC ...... B25J 15/08; B25J 15/103; B25J 15/0433; B25J 19/0025
(Continued)

(56) References Cited

U.S. PATENT DOCUMENTS 4,545,723 A      10/1985  Clark
4,676,541 A  *   6/1987  Lord .................... B25J 15/0475
                                                    294/90
(Continued)

FOREIGN PATENT DOCUMENTS

DE        2 34 825 A1     4/1986
DE        2 40 520 A1    11/1986
(Continued)

OTHER PUBLICATIONS

First Office Action dated Sep. 10, 2020 in related German Application No. 10 2019 125 439.6 filed Sep. 20, 2019 (8 pages) with Google machine translation (6 pages).
(Continued)

*Primary Examiner* — Paul T Chin
(74) *Attorney, Agent, or Firm* — Ronald J. Richter; Nesbitt IP LLC

(57)        ABSTRACT

A gripper jaw for a robot gripper has a first gripper jaw interface corresponding with the robot gripper and a second gripper jaw interface corresponding with tools of a tool set. Each of the gripper jaw interfaces can be used as a mechanical interface, as a signal interface and as a power interface. The tools of the tool set can each include a tool interface corresponding with the second gripper jaw interface, and the gripper jaw can be combined with the tool set in a method of operating a tool system.

18 Claims, 5 Drawing Sheets

(51) Int. Cl.
    *B25J 15/08* (2006.01)
    *B25J 19/00* (2006.01)
(58) Field of Classification Search
    USPC .................................................. 294/192, 213
    See application file for complete search history.

(56) References Cited

U.S. PATENT DOCUMENTS

| | | | | |
|---|---|---|---|---|
| 8,408,619 | B2 * | 4/2013 | Murakami | ............... B25J 15/10 294/213 |
| 8,752,874 | B2 * | 6/2014 | Murakami | ............. B25J 15/026 901/38 |
| 8,794,685 | B2 * | 8/2014 | Murakami | ............... B25J 15/10 294/213 |
| 2006/0012197 | A1 * | 1/2006 | Anderson | ............ B25J 15/0028 294/106 |
| 2008/0023925 | A1 * | 1/2008 | Tomita | ................... B25J 15/026 279/47 |
| 2013/0313791 | A1 | 11/2013 | Setrakian | |
| 2015/0234375 | A1 * | 8/2015 | Takayama | .......... G05B 19/4086 901/41 |
| 2016/0089788 | A1 * | 3/2016 | Nammoto | .............. B25J 9/1633 700/250 |
| 2017/0066140 | A1 | 3/2017 | Guerin | |
| 2019/0061176 | A1 | 2/2019 | Komatsu et al. | |
| 2024/0351222 | A1 * | 10/2024 | Schorr | .................... B22F 12/88 |

FOREIGN PATENT DOCUMENTS

| | | | |
|---|---|---|---|
| DE | 2 91 280 | A5 | 6/1991 |
| DE | 4406771 | A1 | 9/1995 |
| DE | 299 22 476 | U1 | 9/2000 |
| DE | 10 2016 005 002 | A1 | 10/2017 |
| JP | 2008-155305 | A | 7/2008 |
| JP | 2008-155307 | A | 7/2008 |

OTHER PUBLICATIONS

International Search Report and Written Opinion dated Dec. 7, 2020 in corresponding No. PCT/EP2020/076179 filed Sep. 18, 2020 (11 pages) with WIPO machine translation. (5 pages).

First Office Action dated May 17, 2024 in related European Application No. 20780119.2 filed Apr. 11, 2022 (6 pages) with machine translation (7 pages).

* cited by examiner

GRIPPER JAW, TOOL, TOOL SYSTEM AND METHOD FOR OPERATING A TOOL SYSTEM

CROSS-REFERENCE TO RELATED APPLICATIONS

The present application is a National Stage Entry of International Application Number PCT/EP2020/076179, filed Sep. 18, 2020, which claims the benefit of German Application Number DE102019125439.6, filed Sep. 20, 2019, the disclosures of which are hereby incorporated by reference in their entireties.

FIELD OF THE INVENTION

The invention relates to a gripper jaw for a robot gripper. Furthermore, the invention relates to a tool for a gripper jaw. Furthermore, the invention relates to a tool system. Furthermore, the invention relates to a method for operating a tool system.

BACKGROUND OF THE INVENTION

From document DD 234825 A1 a tool system is known for industrial robots, in which grippers as well as tools including hand-held machine tools, such as a drilling, grinding or milling machines, screwdrivers and the like are arranged on the wrist and are used alternately for handling and working or processing workpieces, wherein the gripper jaws of a so-called main gripper are preferably designed for handling workpieces in general and a tool magazine is assigned to the workstation, in which the tools, such as hand-held machine tools, welding tools and others, are provided essentially around a center of gravity with gripping areas corresponding to the gripper jaws of the main gripper and can be handled alternately by the main gripper arranged directly on the wrist of the industrial robot.

From document DD 240520 A1 an adapter connection system is known, preferably for industrial robots for the automatic coupling of the plug-in couplings and coupling pins of power supply and control systems during the automatic change of tools, in which the plug-in couplings, for example consisting of coupling pins and coupling bushes of the power supply and control systems are arranged in their coupling direction at an angle, preferably at right angles to the direction of deposition of the tools thereon and on adapter elements movable in the direction of coupling, for example on legs of gripper jaws of a gripper, for example a gripper for workpieces, of the industrial robot.

From document DD 291280 A5 an additional gripper is known for gripping heads on industrial robots, preferably for loading and unloading processing machines as well as depositing workpieces, wherein the main body of an additional gripper corresponds to the geometric form of the workpiece, wherein the gripper jaws are shaped according to the workpieces and thus both the workpieces and the main body of an additional gripper can be picked up by means of the gripper jaws and wherein a drive of an additional gripper, preferably a cylinder, is arranged on the main gripper.

From document DE 4406771 A1 a gripper is known for an industrial robot arm, which is provided with movable fingers, two of which are opposite one another, wherein the movement of the fingers is controlled by means of shape-memory alloy parts engaging the fingers, and the control of the movement of the shape-memory alloy parts is performed by changing the current flow through the shape-memory alloy parts, furthermore a corresponding control circuit is provided for this purpose, and the two fingers of each pair of fingers are rotatably mounted with their end opposite the freely movable end, wherein the gripper consists of at least one or more pairs of fingers, wherein in each case two of the fingers lie opposite on another on a straight line, wherein each individual finger is subdivided into finger parts, wherein the finger parts of each finger are connected to one another by joints, wherein in each case the end lying opposite the free end of the finger is likewise secured by means of a joint in a changing system on the gripper side, wherein the changing system on the gripper side is arranged interchangeably with the gripper on changing device of the industrial robot arm, wherein the movements of the fingers or finger parts about the joints are performed by means of actuators made from a shape-memory alloy, wherein the first actuators are arranged in the immediate vicinity of the joints at the respective ends of the finger parts of the fingers or at the end of a finger and the gripper-side changing system and are securely connected there to the ends of the finger parts or the changing system, and wherein the first actuators are designed in the form of a leg spring.

The invention is based on the problem of structurally and/or functionally improving a gripper jaw mentioned above. Furthermore, the invention is based on the problem of structurally and/or functionally improving an aforementioned tool. Furthermore, the invention is based on the problem of structurally and/or functionally improving an aforementioned tool system. Furthermore, the invention is based on the problem of improving an aforementioned method.

SUMMARY OF THE INVENTION

The problem is solved with a gripper jaw having the features of claim 1. Furthermore, the problem is solved with a tool having the features of claim 4. Furthermore, the problem is solved with a tool system having the features of claim 8. Furthermore, the problem is solved by a method having the features of claim 9. Advantageous embodiments and/or developments are the subject-matter of the dependent claims.

The gripper jaw can be used for arranging on a robot gripper. The robot gripper can be used as an effector of a robot. The robot gripper can be used to pick up, hold and/or deposit objects. The robot gripper can itself be configured without a signal interface and/or power interface. The robot gripper can have at least two gripping sections that can be moved relative to each other. The gripping sections of the robot gripper can be displaced in a gripper closing direction and/or gripper opening direction in order to pick up and/or deposit an object. The gripping sections of the robot gripper can each have a finger-like form. The gripping sections of the robot gripper and/or the gripper jaw can each have a longitudinal extension and/or longitudinal axis. The longitudinal extension and/or longitudinal axis of the robot gripper and the longitudinal extension and/or longitudinal axis of the gripper jaw can be at least approximately parallel to one another. The gripper closing direction and/or gripper opening direction can be oriented at least approximately perpendicular to the longitudinal extension and/or longitudinal axis. The gripper closing direction and/or gripper opening direction can be oriented at least approximately perpendicular to a transverse extension and/or width extension of the gripping sections of the robot gripper and/or the gripper jaw. The gripper jaw can be used for arranging on a gripping section of the robot gripper. The gripper jaw can be structurally separate from the robot gripper. The gripper jaw can be used with the robot gripper. The robot gripper can also be used without the gripper jaw. The gripper jaw can be connected and/or disconnected from a gripping section of the robot gripper by means of the robot and/or manually on a gripping section of the robot gripper. The gripper jaw can be connected automatically and/or manually to a gripping section of the robot gripper. The gripper jaw can also be referred to as a universal gripper jaw. The gripper jaw can be used as an adapter.

If the robot gripper has at least two gripping sections, a gripper jaw can be arranged respectively on the at least two gripper sections. If the robot gripper is used with at least two gripper jaws, at least one gripper jaw can have a mechanical interface and a signal interface and/or power interface and at least one gripper jaw can have only one mechanical interface.

The gripper jaw can have a gripping side, a rear side, a proximal end and a distal end. The terms proximal end and distal end refer to an arrangement on a robot gripper, wherein the proximal end faces a robot base and the distal end faces away from a robot base. The gripper jaw can be tapered in width and/or thickness at the distal end. The width of the gripper jaw can extend transversely to a gripper closing direction and/or gripper opening direction and to a longitudinal direction. The thickness of the gripper jaw can extend in gripper closing direction and/or gripper opening direction.

The first gripper jaw interface can correspond with the robot gripper, in particular with a gripping section of the robot gripper, in a force-fitting and/or form-fitting manner. The first gripper jaw interface can correspond to be geometrically complementary to the robot gripper, in particular with a gripping section of the robot gripper. The first gripper jaw interface can have a mechanical interface, a signal interface and/or a power interface. The mechanical interface, the signal interface and/or the power interface of the first gripper jaw interface can be structurally and/or functionally combined or separate.

The second gripper jaw interface can correspond with the tools of the tool set in a force-fit and/or form-fitting manner. The second gripper jaw interface can be geometrically complementary to the tools of the tool set. The second gripper jaw interface can have a mechanical interface, a signal interface and a power interface. The mechanical interface, the signal interface and/or the power interface of the second gripper jaw interface can be structurally and/or functionally combined or separate.

The second gripper jaw interface can be structurally directed in a single direction and. connectable and/or disconnectable in this direction. The second gripper jaw interface can be directed towards the gripping side and be connectable and/or disconnectable in gripper closing direction and/or gripper opening direction.

A gripper jaw interface used as a mechanical interface can be in the form of a screw connection or similar. A gripper jaw interface used as a mechanical interface can be used to create a screw connection. A gripper jaw interface used as a mechanical interface can have at least one thread for receiving a screw. A gripper jaw interface used as an mechanical interface can be effective in a force-fitting and/or form-fitting manner. A gripper jaw interface used as a mechanical interface can be formed by means of at least one recess and/or at least one projection. A gripper jaw interface used as a mechanical interface can be used for centering. A gripper jaw interface used as a mechanical interface can have inlet ramps. This enables a definite positioning and/or movement of tools. The gripper jaw interfaces can each be configured as a plug-in connector. The gripper jaw interfaces can each have a locking device. The gripper jaw interfaces can each be used for transmitting signals. Signals can be used for transmitting information. Signals can be used for controlling tools. The control can consist of control-engineering and/or control technology control. The gripper jaw interfaces can be used for power transmission. Power can be used for operating tools. A gripper jaw interface used as a signal interface and/or power interface can be externally connectable and controllable by means of hoses and/or cables.

A gripper jaw interface used as signal interface and/or a power interface can be pneumatic, hydraulic and/or electric. A gripper jaw interface used as signal interface and/or a power interface can be used for transmitting pneumatic, hydraulic and/or electric signals. A gripper jaw interface used as a signal interface and/or power interface can be used for transmitting pneumatic, hydraulic and/or electric power.

The gripper jaw can have a gripping surface. The gripping surface can be formed by an elastic material, such as foam rubber, rubber or silicone. The elastic material can be used to seal a pneumatic or hydraulically acting interface.

The tool can have a tool interface corresponding to the second gripper jaw interface. The tool interface can correspond with the second gripper jaw interface in a force-locking and/or form-fitting manner. The tool interface can correspond with the second gripper jaw interface in a geometrically complementary manner. The tool interface can be used as a mechanical interface, a signal interface and/or a power interface. The tool interface can be configured as a plug-in connector. The tool interface can have a locking device. The tool interface can be used for transmitting signals. The tool interface can be used for power transmission. The tool interface can operate pneumatically, hydraulically and/or electrically. The tool interface can be used to transmit pneumatic, hydraulic and/or electric signals. The tool interface can be used to transmit pneumatic, hydraulic and/or electric power.

The tool can have a support device for positioning. The tool can be placed at predetermined positions. The tool can be positioned at predetermined positions on a work surface or relative to a work surface. The tool can be positioned such that it can be connected to a gripper jaw. The tool can be positioned in such a way that it can be picked up by means of at least one gripper jaw. The tool can be positioned such that accessibility to the tool interface is ensured. The support device can be adjusted between a support position and a working position. In the support position the support device can allow the tool to be placed in a fixed and/or secure position. In the working position the cool can be used unhindered.

The support device can be adjusted by means of gripper jaw. The support device can be leg-like. The support device can be foldable, retractable or attachable.

The tool can be used for gripping, holding, fixing, processing, measuring, dosing and/or as an adapter. The tool can be pliers, a screwdriver, a suction pad, a gripper extension, a pneumatic hammer or a pneumatic hammer or a pneumatic/electric pipette.

The tools of the tool set can be used as necessary. A first tool can be firstly selected, then picked up from a predetermined position, then used and then deposited in a predetermined position. At least one further tool can firstly be selected, then picked up from a predetermined position, then used and then deposited in a predetermined position. A tool can be picked up from a predetermined first position and a predetermined second position. The first position and the second position can be the same position or different positions. On picking up a tool can be connected to the at least one gripper jaw. After picking up a tool the support device can be adjusted into the working position. Before depositing a tool the support device can be adjusted into the support position. On depositing a tool can be released from the at least one gripper jaw. Information about a positioning of tools can be saved.

In summary and in other words the invention results in among other things universal gripper jaws for robot grippers and a flexible robot tool system. The universal gripper jaws can pick up tools through an interface and supply them with pneumatics, communication or voltage. It is therefore not necessary to exchange complete grippers or end effector systems. The universal gripper jaws can be used to mount storage units with components in any location where a special tool or even just a smaller extension is mounted in the immediate vicinity and can be gripped and activated using the universal gripper jaws. Independently of the gripper system in this way different tools can be gripped and the robot application can be provided with a very high degree of flexibility.

Multifunctional gripper jaws, can be used an interfaces to all conventional gripper systems for robots. The gripper jaws can have a pneumatic and communication interface and also voltage supply. The gripper jaws can be used for gripping all objects in conventional gripping tasks, without an additional tool. A passive tool system can be provided, comprising a plurality of tools for flexible use for robot systems. The tool system can have an interface to the gripper jaw. By means of support systems the tools can be deposited anywhere on the workspace, so that they can be positioned in the best possible way without additional holding and can always be gripped by the robot system. An initial mechanical force can provide at least so much friction or a mechanical fixing that the tool can be carried. An additional force can result in the folding up, retraction, application, . . . , of supports of the tool so that the tool can provide a required precision and there are no obstructing supports to affect the tool. Tools can be pliers, screwdrivers, suction pads, gripper extensions, pneumatic hammers, pneumatic/electric pipettes, etc.

By means of the invention flexibility is increased and set-up times are reduced, thereby increasing the efficiency of manufacturing processes.

BRIEF DESCRIPTION OF THE FIGURES

In the following exemplary embodiments of the invention are described in more detail with reference to the Figures, in a schematic manner and by way of example.

DETAILED DESCRIPTION OF THE FIGURES

Figure 1:
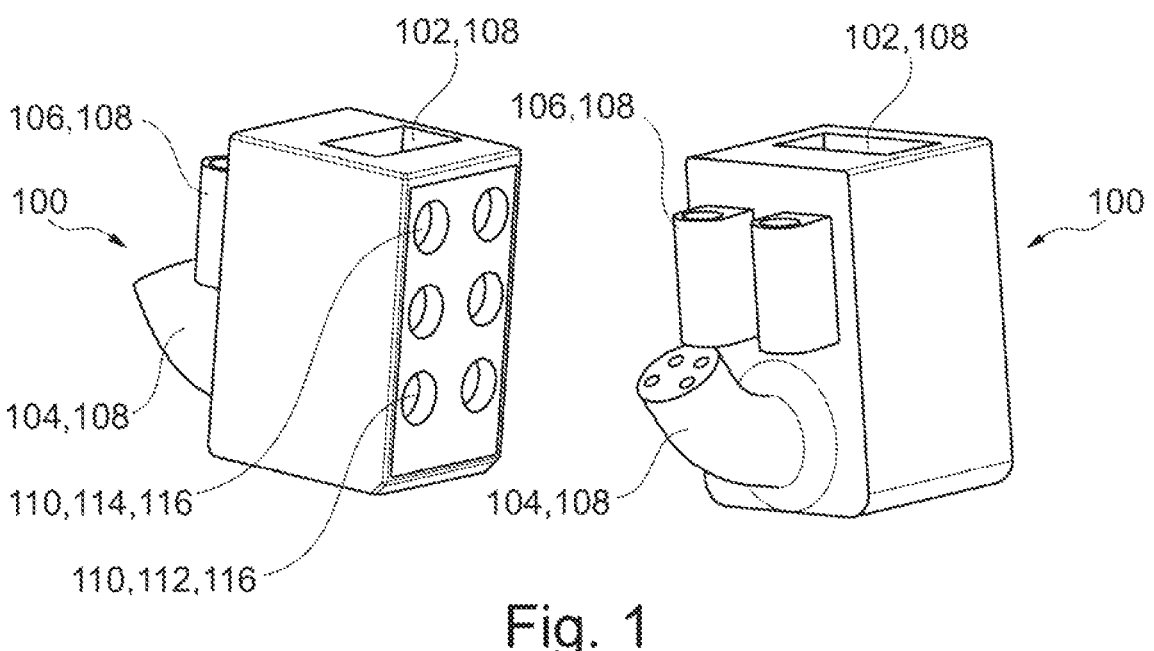
FIG. 1 shows a gripper jaw for a robot gripper in two different axonometric views.

FIG. 1 shows a gripper jaw 100 for a robot gripper in two different axonometric views.

The gripper jaw 100 has a mechanical interface 102, a signal interface 104 and a power interface 106 for the robot gripper, which are referred to in combination as first gripper jaw interface 108. The mechanical interface 102, the signal interface 104 and the power interface 106 for the robot gripper are configured to be structurally separate here.

The gripper jaw 100 has a mechanical interface 110, a signal interface 112 and a power interface 114 for a tool of a tool set, which is referred to in combination as second gripper jaw interface 116. The mechanical interface 110, the signal interface 112 and the power interface 114 for a tool are configured to be structurally combined here.

The first gripper jaw interface 108 corresponds functionally and is geometrically complementary to a gripping section of the robot gripper. The second gripper jaw interface 116 corresponds functionally and is geometrically complementary to the tools of the tool set.

Figure 2:
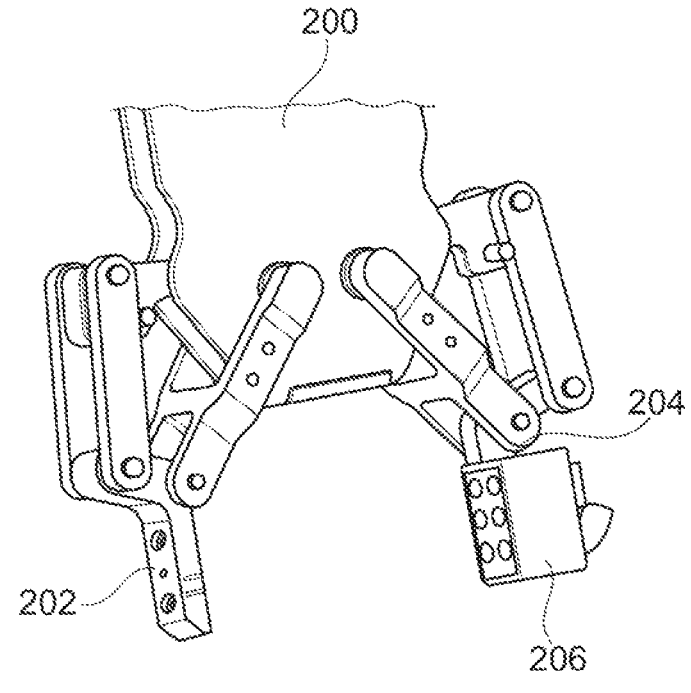
FIG. 2 shows a robot gripper with a gripper jaw.

FIG. 2 shows a robot gripper 200 with two finger-like gripping sections 202, 204 displaceable relative to one another and a gripper jaw 206, like gripper jaw 100 according to FIG. 1.

Figure 3:
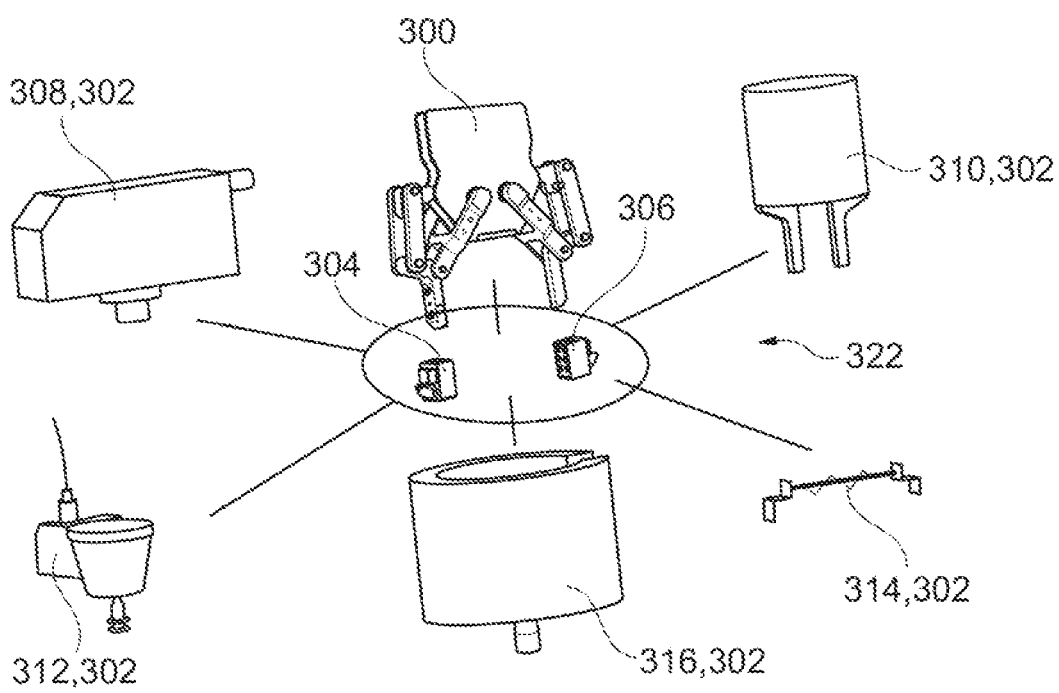
FIG. 3 shows a tool system with gripper jaw and tools.
Figure 4:
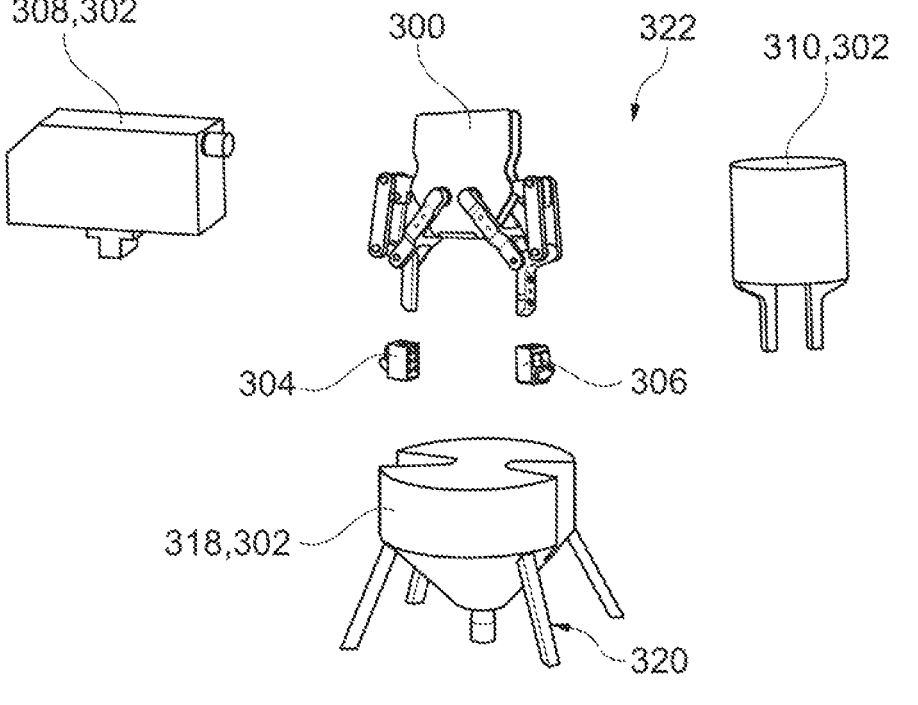
FIG. 4 shows a tool system with gripper jaw and tools.

FIG. 3 and FIG. 4 show respectively a robot gripper 300 and a tool system 322 with gripper jaws 304, 306, like gripper jaw 100 according to FIG. 1, and tools 308, 310, 312, 314, 316, 318. The tools each have a tool interface corresponding with the second gripper jaw interface of the gripper jaws 304, 306.

The tool 318 has a leg-like support device 32( )which is adjustable between a support position and a working position. In the support position the tool 318 can thus be deposited in predetermined positions of a working surface such that accessibility to the tool interface is ensured in order for the gripper jaw 304, 306 to pick it up. In the working position unhindered use of the tool is made possible. The support device can be adjusted by means of a gripper jaw. The support device can be configured to be leg-like. The support device can be foldable, retractable or attachable.

The tools 308, 310, 312, 314, 316, 318 can be used if necessary and form a tool set 302.

Figure 5:
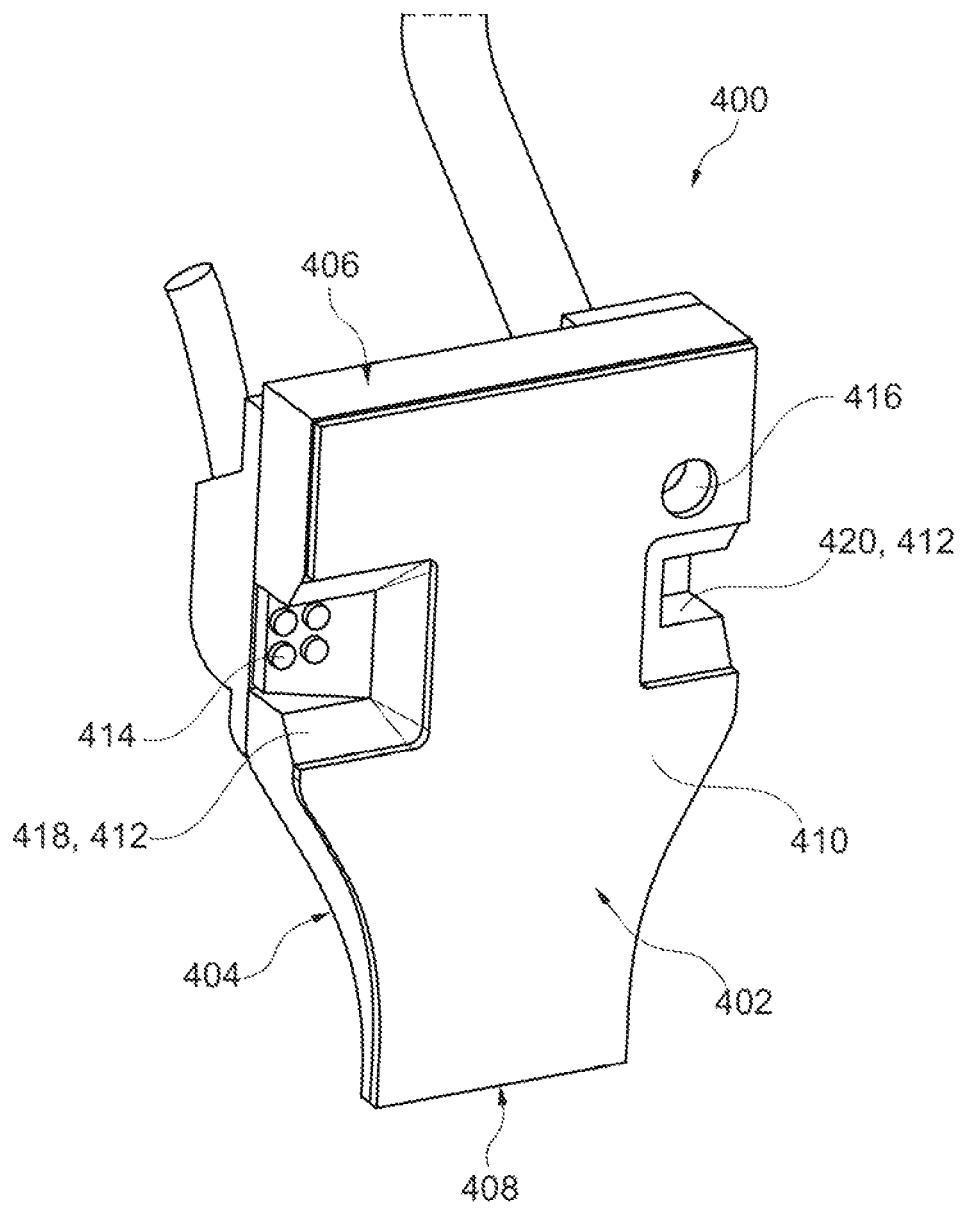
FIG. 5 shows a gripper jaw for a robot gripper.

FIG. 5 shows a gripper jaw 400 for a robot gripper. The gripper jaw 400 has a gripping side 402, a rear side 404, a proximal end 406 and a distal end 408. The gripper jaw 400 is tapered at the distal end 408 both in its width, transverse to the gripper closing direction and to the longitudinal direction, and also in its thickness, in gripper closing direction. On the gripping side 402 the gripper jaw 400 has a gripping surface 410 which is made from an elastic material, such as foam rubber, rubber or silicone.

The gripper jaw 400 has a mechanical interface 412, an electronic interface and/or communication interface 414 and a pneumatic interface 416 for a tool of a tool set. The electronic interface and/or communication interface 414 and/or the pneumatic interface 416 can be a signal interface or a power interface.

The mechanical interface 412 is formed by means of two recesses 418, 420, which are each accessible in gripper closing direction and open on the outside transverse to the gripper closing direction and to the longitudinal direction. The recesses 418, 420 are used for form-fitting connection with a tool transverse to the gripper closing direction.

On the gripping side 402 the recesses 418, 420 each have effective inlet ramps in the gripper closing direction in order to make it easier to pick up a tool. The electronic interface and/or communication interface 414 is arranged on the rear side on the recess 418 and is thus set back and protected from the gripping surface. The pneumatic interface 416 has an opening leading into the gripping surface 410, which is sealed in contact with a tool by means of the elastic material of the gripping surface 410. On the rear side 404 the gripper jaw 400 has a mechanical interface for the robot gripper.

Figure 6:
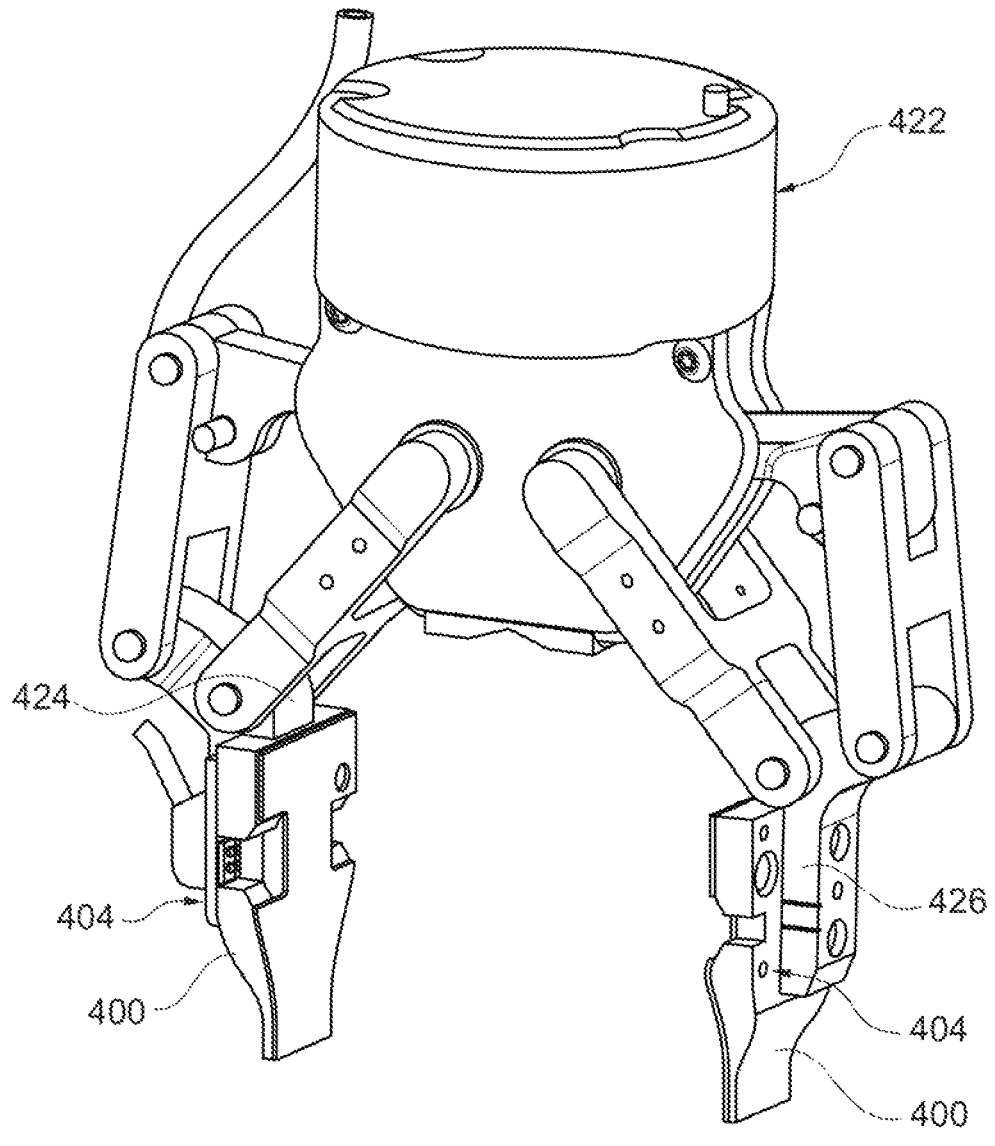
FIG. 6 shows a robot gripper with gripper jaws and FIG. 7 shows a robot gripper with gripper jaws and a tool.

FIG. 6 shows a robot gripper 422 with two gripper jaws 400. The gripper jaws 400 are each screwed with their rear side 404 to a gripping section 424, 426 of the robot gripper 422. Each of the gripper jaws 400 has a mechanical interface 412, but only one of the gripper jaws 400 has an electronic interface and/or communication interface and a pneumatic interface. In addition, reference is made in particular to 2 and FIG. 5 and the associated description.

Figure 7:
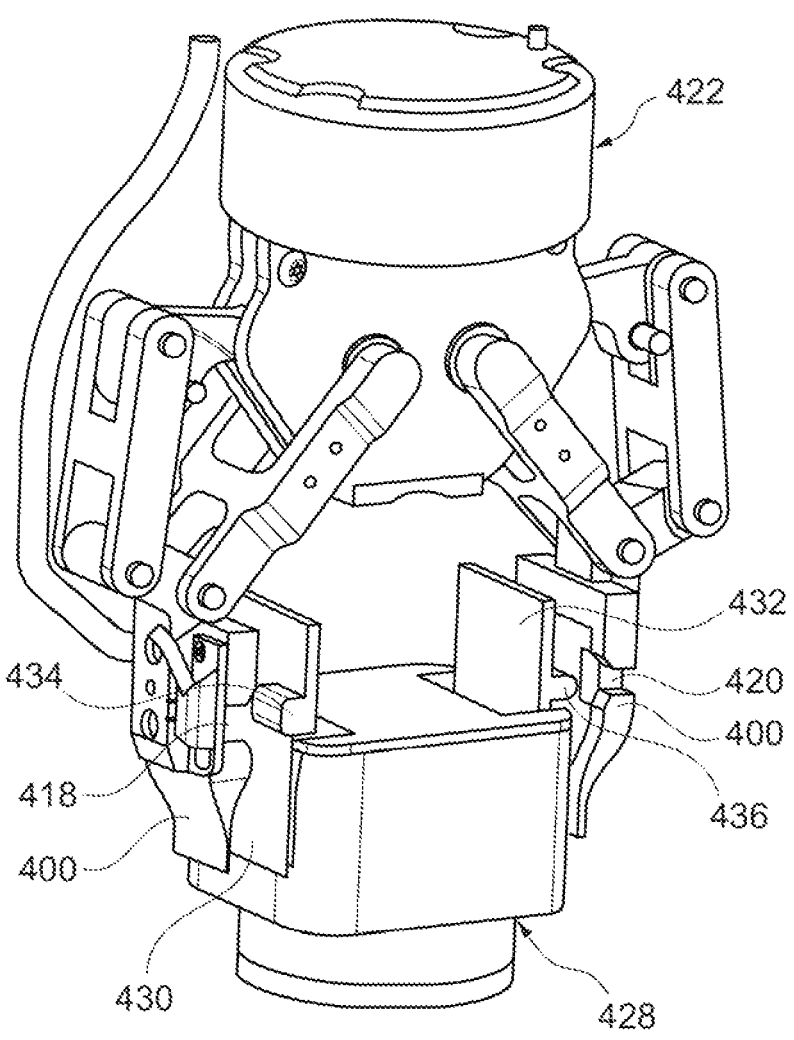

FIG. 7 shows the robot gripper 422 with gripper jaws 400 and a tool 428. The tool 428 has a tool interface which is formed by means of two plate-like interface elements 430, 432. The interface elements 430, 432 each have corresponding projections, such as 434, 436, geometrically complementary to the recesses 418, 420 of the gripper jaw 400. At least the interface element 430 also has an electronic interface and/or communication interface and a pneumatic interface. In addition, reference is made in particular to FIG. 2, FIG. 3, FIG. 4, FIG. 5 and FIG. 6 as well as the associated description.

"Can" refers in particular to optional features of the invention. Accordingly there are also further developments and/or embodiments of the invention, which additionally or alternatively have the respective feature or the respective features.

From the combinations of features disclosed herein, isolated features can also be selected and used in combination with other features to delimit the subject-matter of the claims to resolve any structural and/or functional relationship that may exist between the features.

REFERENCE SIGNS 100 gripper jaw
102 mechanical interface
104 signal interface
106 power interface
108 first gripper jaw interface
110 mechanical interface
112 signal interface
114 power interface
116 second gripper jaw interface
200 robot gripper
202 gripping section
204 gripping section
206 gripper jaw
300 robot gripper
302 tool set
304 gripper jaw
306 gripper jaw
308 tool
310 tool
312 tool
314 tool
316 tool
318 tool
320 support device
522 tool system
400 gripper jaw
402 gripping side
404 rear side
406 end
408 end
410 gripping surface
412 mechanical interface
414 electronic interface, communication interface
416 pneumatic interface
418 recess 420 recess
422 robot gripper
424 gripping section
426 gripping section
428 tool
430 interface element
432 interface element
434 projection
436 projection

The invention claimed is:

1. A gripper jaw for a robot gripper, the gripper jaw comprising:
   (a) a first gripper jaw interface corresponding with the robot gripper, the first gripper jaw interface comprising:
      (i) a first mechanical interface;
      (ii) a first signal interface; and
      (iii) a first power interface, wherein the first mechanical interface, the first signal interface, and the first power interface of the first gripper jaw interface are structurally separate; and
   (b) a second gripper jaw interface corresponding with tools of a tool set, wherein the second gripper jaw interface is used respectively as a second mechanical interface, a second signal interface and/or a second power interface.

2. The gripper jaw according to claim 1, wherein the first and second signal interfaces and the first and second power interfaces operate pneumatically, hydraulically and/or electrically.

3. The gripper jaw according to claim 2, wherein a gripper jaw interface used as a mechanical interface is used for centering.

4. A tool for the gripper jaw according to claim 2, wherein the tool has a tool interface corresponding with the second gripper jaw interface.

5. The tool according to claim 4, wherein the tool has a support device for positioning.

6. The tool according to claim 4, wherein the tool is used for gripping, holding, fixing, processing, measuring, dosing and/or as an adapter.

7. The tool according to claim 5, wherein the support device can be adjusted between a support position and a working position.

8. The tool according to claim 5, wherein the tool is used for gripping, holding, fixing, processing, measuring, dosing and/or as an adapter.

9. The gripper jaw according to claim 1, wherein the first and second mechanical interfaces are used for centering.

10. A tool for the gripper jaw according to claim 1, wherein the tool has a tool interface corresponding with the second gripper jaw interface.

11. The tool according to claim 10, wherein the tool has a support device for positioning.

12. The tool according to claim 11, wherein the support device can be adjusted between a support position and a working position.

13. The tool according to claim 12, wherein the tool is used for gripping, holding, fixing, processing, measuring, dosing and/or as an adapter.

14. The tool according to claim 12, wherein the tool is used for gripping, holding, fixing, processing, measuring, dosing and/or as an adapter.

15. The tool according to claim 11, wherein the tool is used for gripping, holding, fixing, processing, measuring, dosing and/or as an adapter.

16. The tool according to claim 10, wherein the tool is used for gripping, holding, fixing, processing, measuring, dosing and/or as an adapter.

17. A tool system having at least one gripper jaw according to claim 1 and a tool set with tools according to claim 10.

18. A method for operating a tool system according to claim 17, wherein a tool is firstly selected, then picked up from a predetermined position, then used and then deposited in a predetermined position.

*    *    *    *    *